United States Patent [19]

Chiu

[11] Patent Number: 5,172,451
[45] Date of Patent: Dec. 22, 1992

[54] FRONT CASTER DEVICE FOR INFANT STROLLER

[75] Inventor: Hsiu-Hui Chiu, Tainan Hsien, Taiwan

[73] Assignee: Sunshon Molding Co., Ltd., Tainan Hsien, Taiwan

[21] Appl. No.: 803,422

[22] Filed: Dec. 6, 1991

[51] Int. Cl.⁵ ............................................. B60B 33/00
[52] U.S. Cl. ................................... 16/35 R; 16/29
[58] Field of Search ............... 16/29, 30, 31, 35 R; 188/1.12

[56] References Cited

U.S. PATENT DOCUMENTS

| 4,759,098 | 7/1988 | Ko | 16/35 R |
| 4,847,945 | 7/1989 | Schwartz et al. | 16/35 R |
| 4,969,230 | 11/1990 | Huang | 16/35 R |

Primary Examiner—W. Donald Bray
Attorney, Agent, or Firm—Morton J. Rosenberg; David I. Klein

[57] ABSTRACT

A front caster device for an infant stroller including a bulb integrally attached to distal end of a front leg, a mounting hub attached to the bottom of the bulb in a manner that the hub is axially rotatable with respect to the bulb, a locking device for selectively locking the hub in a pre-selected angle with respect to the bulb, a wheel mounting bracket hingedly attached to the hub and a cushion fitted between the hub and wheel mounting bracket for absorb vibration rendering greater comfort a baby contained in the stroller.

3 Claims, 5 Drawing Sheets

FRONT CASTER DEVICE FOR INFANT STROLLER

BACKGROUND OF THE INVENTION

The present invention relates to a caster device and more particularly to an improved front caster device for an infant stroller which is easy in assembly and operation.

Infant stroller and the like are known in the art. Mostly, a pair of casters are pivotally attached to the spaced front legs of an infant stroller to facilitate directing the infant stroller when strolling.

Prior art known to the applicant include U.S. Pat. No. 4,897,895 granted to Wang which discloses a front caster device comprising a bracket for mounting a ground supporting wheel thereto. Said bracket includes a socket having an inner flange and a bushing adapted to be rotatably fitted and engaged in the socket by two flexible detents which extend outwardly and upwardly from the periphery of bushing.

For collapsible strollers, it is found necessary that the front casters thereof should be locked in position for ease of folding operation. Said known art has no means for locking front casters in position. Moreover, as no cushion device is equipped to the known stroller, strolling said stroller along a bumpy road causes greater physical strain to the operator or parents and less comfort to the child.

OBJECT OF THE INVENTION

It is accordingly a primary object of the present invention to provide an improved front caster device for an infant stroller that overcomes the foregoing defects associated with prior art.

DETAILED DESCRIPTION OF THE PREFERRED EMBODIMENT

Figure 1:
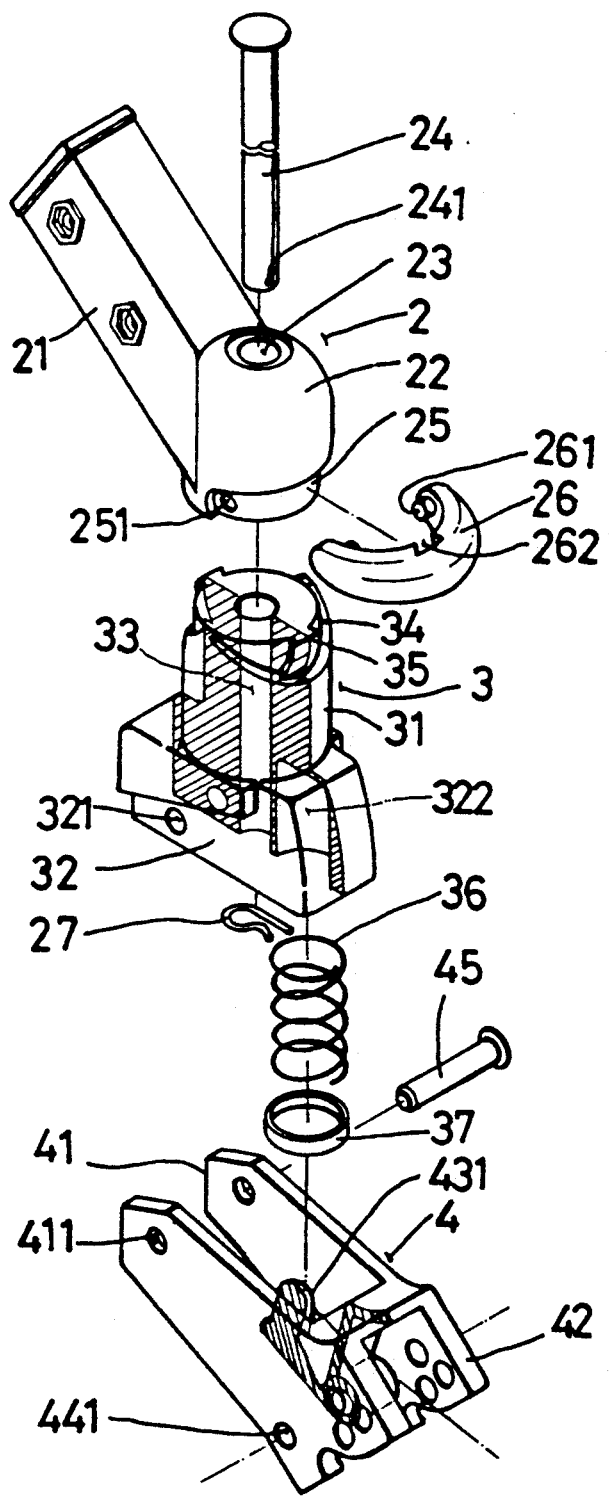
FIG. 1 is an exploded perspective view embodying a front caster device of the present invention.

Referring to FIG. 1, a preferred embodiment according to the present invention which mainly comprises a bulb 2 integrally attached to a lower distal end of a front leg 21 of an infant stroller, a mounting hub 3 pivoted under the bulb 2 with a pin 24 and a wheel mounting bracket 4 hingedly attached to the bracket 4.

The bulb 2 is formed with a passage 23 extending vertically therethrough to receive the pin 24 passing through the passage 23 and a cut-off portion 25 in a lowermost front portion thereof. A pair of pivot holes 251 are opposedly formed in the cut-off portion 25. A curved actuator 26 has a pair of pivots 261 to be inserted in said pivot holes 251 and is provided with a guide groove 262 in an inner surface thereof.

The mounting hub 3 is secured to the bottom of the bulb 2 by the pin 24 which extends downwardly through an axial passage 33 extending vertically through the mounting hub 3 and protrudes slightly from the bottom of the mounting hub 3 so as to be locked in position with a key 27 which is press-fitted in a key hole 241 in the lower end of the pin 24 such that the hub 3 is turnable about the pin 24 with respect to the bulb 2. The mounting hub 3 includes a cylindrical body 31 and a solid base 32 under the cylindrical body 31. Top end of the cylindrical body 31 is formed with two cut-off portions each of which is provided with a projection 35 extending substantially axially and adapted to be frictionally engaged in the guide groove 262 of the actuator 26. The base 32 is formed with a pin hole 321 extending transversely therethrough and a chamber 322 spaced from the pin hole 321 and extending axially to the bottom thereof for accommodating a coil spring 36.

The wheel mounting bracket 4 includes a generally inverted U-shaped bracket member 42 which is provided with an axle receiving aperture 441 and a subsidiary bracket member 41 opposite to the bracket member 42. The subsidiary bracket member 41 is provided with a pair of apertures 411 for hingedly securing the wheel mounting bracket 4 to the base 32 of the mounting hub 3 with a rivet 45 which extends through the apertures 411 and pin hole 321. Disposed within the subsidiary bracket member 41 is a hook member 431 for abutting the lower end of the tray 37 which retains the lower end of the coil spring 36.

Figure 2:
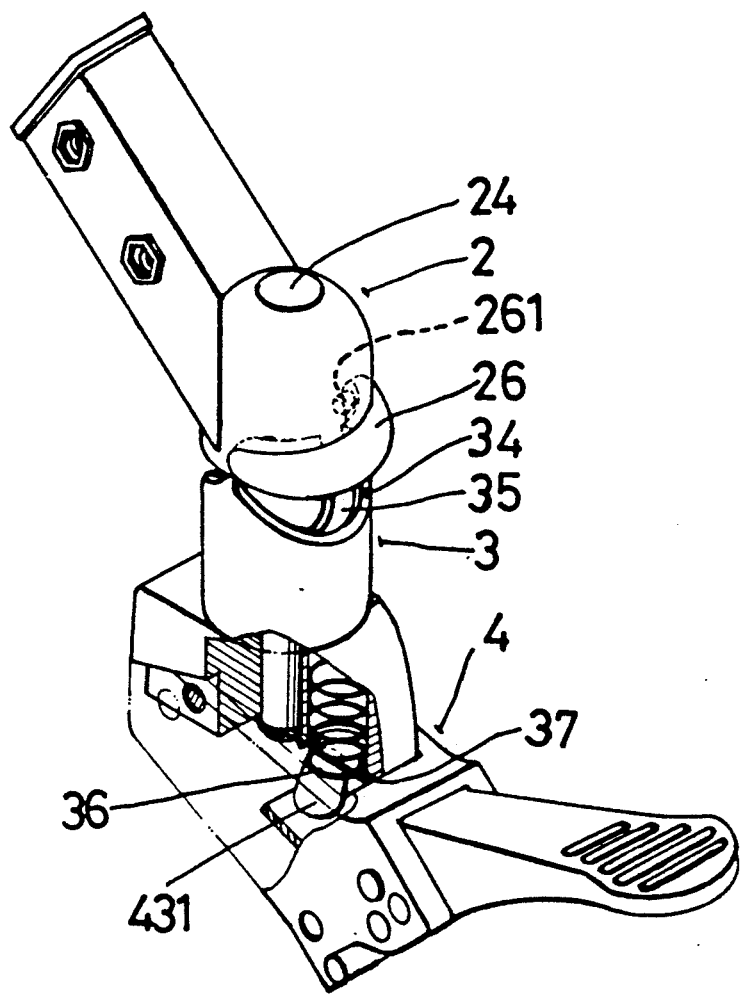
FIG. 2 is a perspective view of the front caster device shown in FIG. 1 wherein the device is partially broken away and in assembled condition.
Figure 3:
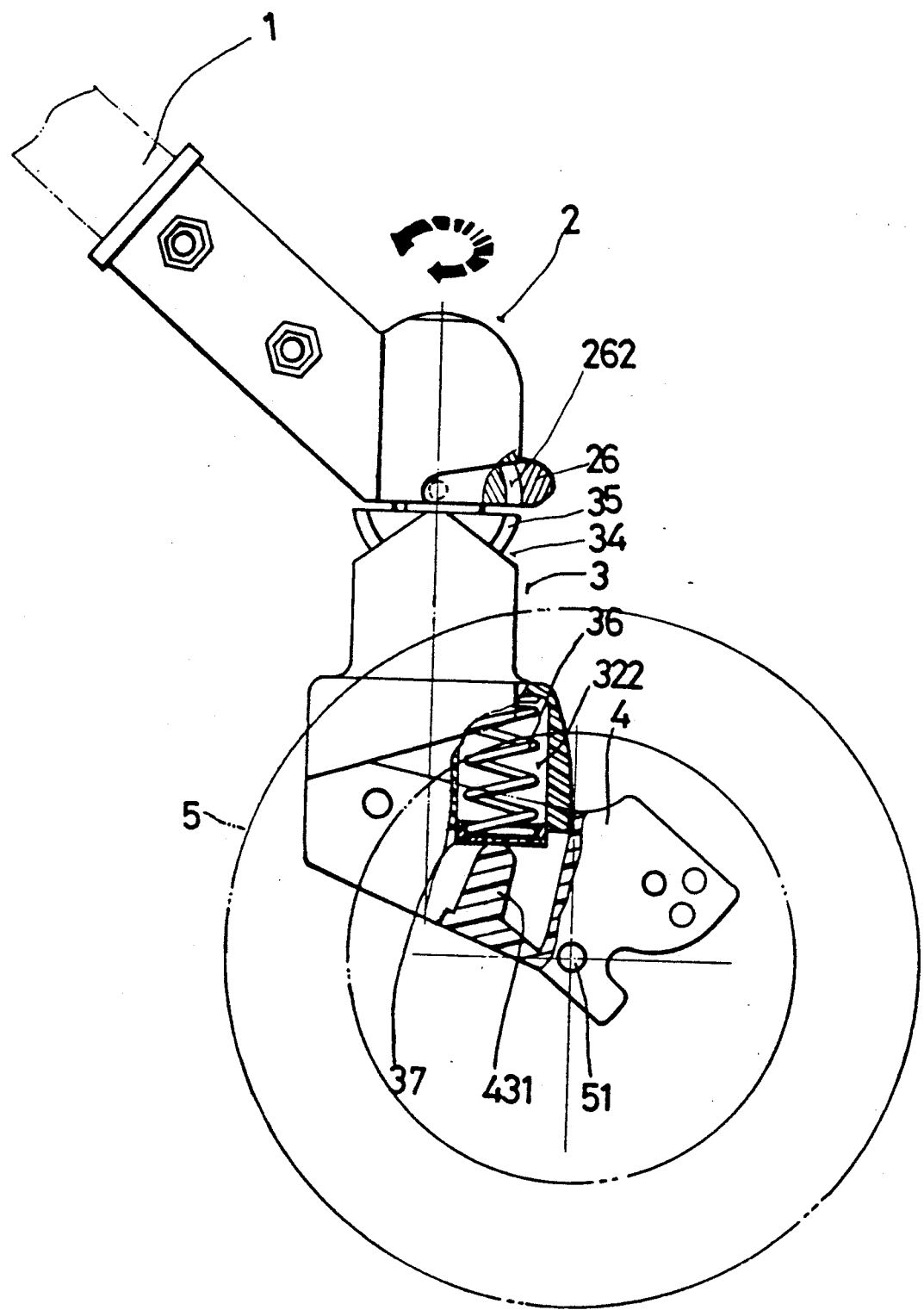
FIG. 3 is a side elevation of the front caster device shown in FIG. 2.
Figure 4:
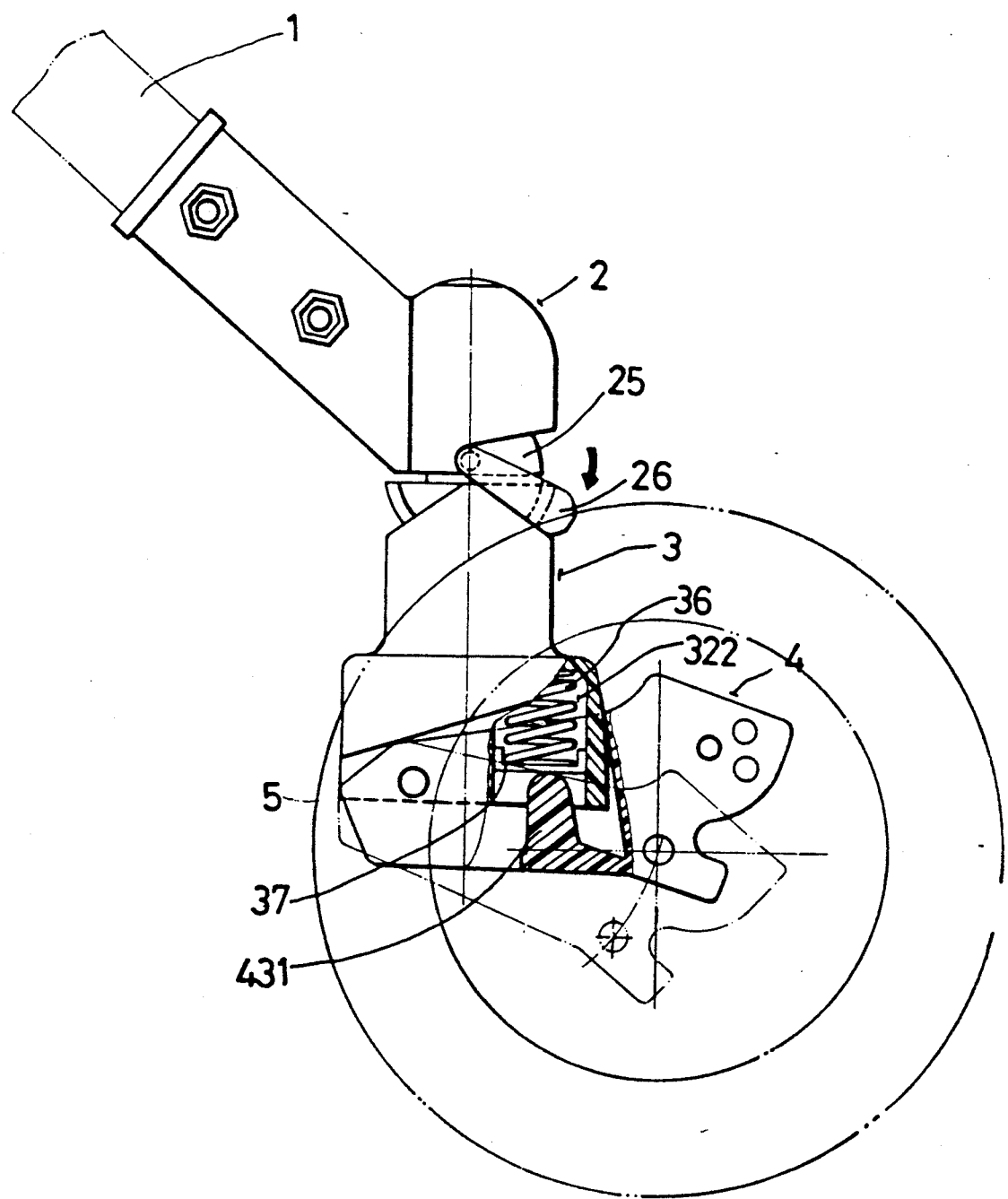
FIG. 4 is a side elevation of the front caster device which is in locked condition.

FIGS. 2 to 4 illustrate this embodiment in its assembled condition wherein the pin 24 extends through the vertical passages 23, 33 of the bulb 2 and mounting hub 3 and is secured in position by means of the key 27, as shown in FIG. 2, at the bottom of the mounting hub 3. The actuator 26 is mounted on the cut-off portion 25 of the bulb 2 with its pivots 261 inserted in pivot holes such that the actuator 26 can be swung between an unlocking position, as best shown in FIG. 3, that allows the front caster 5 to rotate freely about the pin 24 for a direction control to an operator or parents, and a locking position, as best shown in FIG. 4, by sliding the guide groove 262 along the projection 35 that locks the front caster 5 in a preset direction such as a straight direction for ease in control.

Figure 5:
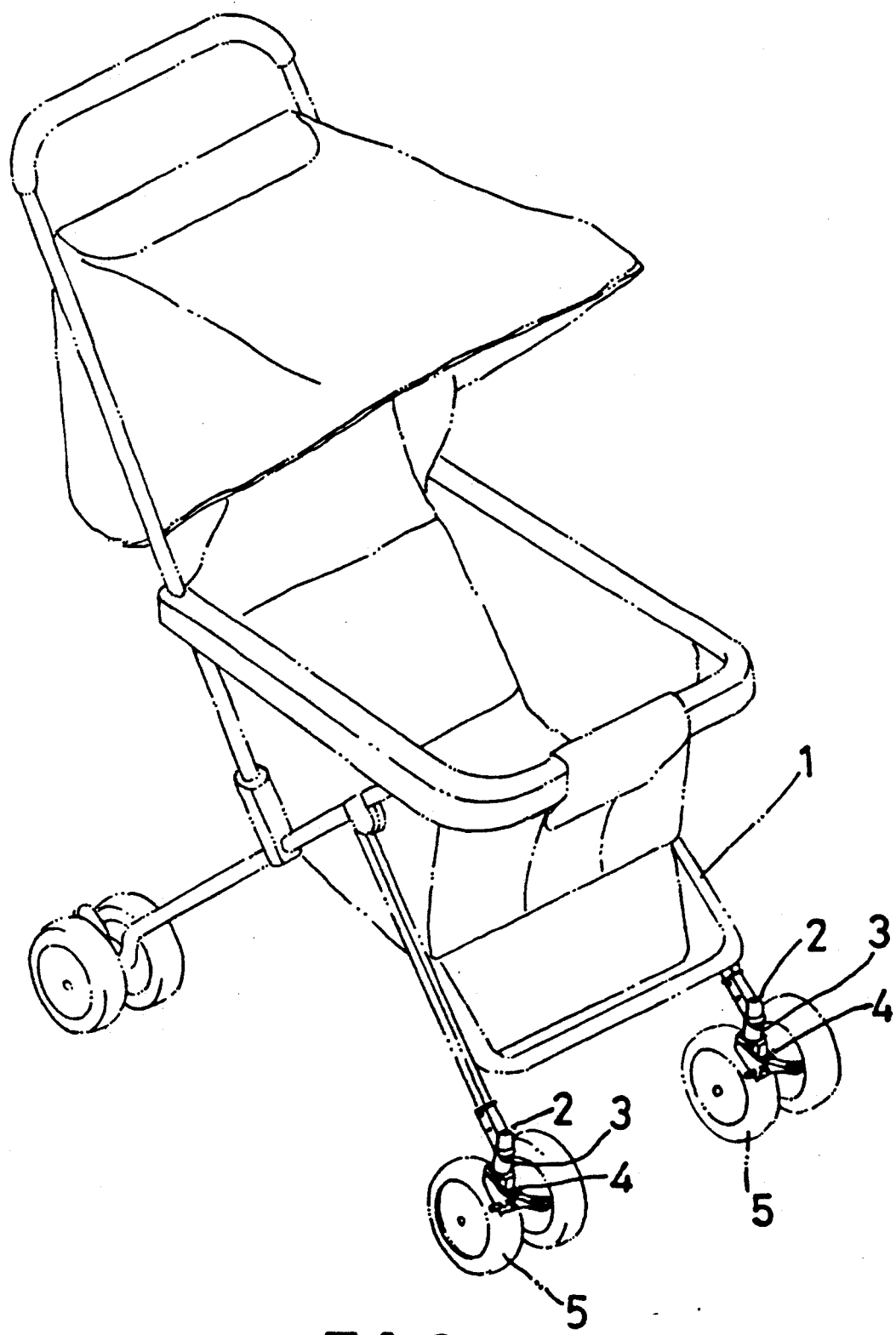
FIG. 5 is a perspective view illustrating the front caster devices attached to distal ends of front legs of an infant stroller.

The coil spring 36 thus equipped within the front caster device of this invention performs as a cushion to absorb vibration of the front caster 5 when strolling the infant stroller along a bumpy road, as shown in FIG. 4. The mounting hub 3, wheel mounting bracket 4 and front caster 5 can be easily mounted to the bulb 2 of one of the front legs of an infant stroller 1 as shown in FIG. 5.

I claim:

1. A front caster device for an infant stroller comprising:
   a bulb integrally attached to a distal end of a front leg of the infant stroller and provided with a passageway extending vertically therethrough and a first cut-off portion in a lowermost periphery thereof;
   a pair of pivot holes opposedly located in the first cut-off portion of the bulb;
   a cylindrical hub having a passageway extending axially and vertically therethrough, at least a second cut-off portion formed in an upper periphery thereof and a pin hole extending transversely in a lower side portion thereof;
   a pin extending through the passageways of the bulb and hub to secure the hub under the bulb and permit free rotation of the hub about the pin with respect to the bulb;

a wheel mounting bracket including a first subsidiary bracket for mounting an axle along a transverse axis for rotatably mounting a ground supporting wheel thereto and a second subsidiary bracket opposed to the first subsidiary bracket and provided with a pair of apertures for receiving a rivet which extends through the pin hole of the hub to hingedly attached the wheel mounting bracket to the hub; and an actuator having a pair of pivots extending opposedly from an inner surface thereof and adapted to be inserted in the pivot holes for swinging the actuator between a first position wherein the hub is rotatable about the pin with respect to the bulb and a second position wherein the second cut-off portion of the hub corresponds the first cut-off portion and the hub is restricted in a preselected angle with respect to the bulb.

2. A front caster device as claimed in claim 1, wherein the second cut-off portion of the hub is further provided with a projection which extends axially and upwardly to the top end of the hub and the actuator is formed with a groove engageable with the projection to prevent rotation of the hub about the pin with respect to the bulb.

3. A front caster device as claimed in claim 1, wherein the hub is provided with an internal chamber which extends axially downwardly to a bottom of the hub in a side portion spaced from the pin hole for accommodating a coil spring and the second subsidiary bracket of the wheel mounting bracket is provided with a retainer for retaining a lower end of the coil spring which performs a cushion function to the infant stroller.

* * * * *